United States Patent
Albertus et al.

(10) Patent No.: US 10,270,093 B2
(45) Date of Patent: Apr. 23, 2019

(54) AQUEOUS LI/O₂ BATTERY WITH WATER STORAGE

(71) Applicant: Robert Bosch GmbH, Stuttgart (DE)

(72) Inventors: Paul Albertus, Washington, DC (US); John F. Christensen, Mountain View, CA (US); Timm Lohmann, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 459 days.

(21) Appl. No.: 14/758,321

(22) PCT Filed: Dec. 27, 2013

(86) PCT No.: PCT/US2013/077955
§ 371 (c)(1),
(2) Date: Jun. 29, 2015

(87) PCT Pub. No.: WO2014/106027
PCT Pub. Date: Jul. 3, 2014

(65) Prior Publication Data
US 2015/0357693 A1    Dec. 10, 2015

Related U.S. Application Data

(60) Provisional application No. 61/746,286, filed on Dec. 27, 2012.

(51) Int. Cl.
*H01M 4/38* (2006.01)
*H01M 12/08* (2006.01)
*C25B 1/02* (2006.01)

(52) U.S. Cl.
CPC ........... *H01M 4/382* (2013.01); *H01M 12/08* (2013.01); *C25B 1/02* (2013.01); *H01M 2300/0002* (2013.01); *Y02E 60/128* (2013.01)

(58) Field of Classification Search
CPC ...... H01M 4/381; H01M 4/382; H01M 12/08; H01M 2300/0002; Y02E 60/128; C25B 1/02
(Continued)

(56) References Cited

U.S. PATENT DOCUMENTS

2012/0021303 A1*  1/2012  Amendola .............. H01M 4/42
                                                                         429/406
2012/0088163 A1   4/2012  Ryu et al.

FOREIGN PATENT DOCUMENTS

EP        2 254 192 A1    11/2010
JP        2011 258489 A   12/2011

OTHER PUBLICATIONS

Machine Translation of JP 2011258489 A, Zhou Hao Shen, "Lithium-Air Cell Comprising Positive Ion Exchange Membrane Between Solid Electrolyte Membrane and Electrolytic Solution for Air Electrode", extracted on Jun. 27, 2017.*

(Continued)

*Primary Examiner* — Milton I Cano
*Assistant Examiner* — Abibatu O Ojo-Amoo
(74) *Attorney, Agent, or Firm* — Maginot Moore & Beck LLP (57) ABSTRACT

An electrochemical cell includes an anode including a form of lithium metal, an OH⁻ exchange membrane, a precipitate reservoir in fluid communication with the anode and the OH⁻ exchange membrane, an O₂ evolution electrode associated with the precipitate reservoir, and a fluid reservoir in fluid communication with the precipitate reservoir, wherein the fluid reservoir includes form of water when the electrochemical cell is fully charged.

7 Claims, 8 Drawing Sheets

(58) Field of Classification Search
USPC .................................................. 429/402, 405
See application file for complete search history.

(56) References Cited

OTHER PUBLICATIONS

International Search Report and Written Opinion corresponding to PCT Application No. PCT/US2013/077955, dated Mar. 24, 2014 (10 pages).
Christensen et al.; A Critical Review of Li/Air Batteries; Journal of the Electrochemical Society; Jan. 1, 2012; pp. R1-R30; vol. 159, Issue No. 2.
Zhou et al.; The Development of a New Type of Rechargeable Batteries Based on Hybrid Electrolytes; ChemSusChem; Sep. 24, 2010; pp. 1009-1019; vol. 3, Issue No. 9.

* cited by examiner

AQUEOUS LI/O₂ BATTERY WITH WATER STORAGE

This application is a 35 U.S.C. § 371 National Stage Application of PCT/US2013/077955, filed on Dec. 27, 2013, which claims the benefit of priority to U.S. Provisional Application No. 61/746,286, filed Dec. 27, 2012, the disclosures of which are incorporated herein by reference in their entirety.

FIELD

This disclosure relates to batteries and more particularly to metal/air based batteries.

BACKGROUND

Rechargeable lithium-ion batteries are attractive energy storage systems for portable electronics and electric and hybrid-electric vehicles because of their high specific energy compared to other electrochemical energy storage devices. A typical Li-ion cell contains a negative electrode, a positive electrode, and a separator region between the negative and positive electrodes. Both electrodes contain active materials that insert or react with lithium reversibly. In some cases the negative electrode may include lithium metal, which can be electrochemically dissolved and deposited reversibly. The separator contains an electrolyte with a lithium cation, and serves as a physical barrier between the electrodes such that none of the electrodes are electronically connected within the cell.

Typically, during charging, there is generation of electrons at the positive electrode and consumption of an equal amount of electrons at the negative electrode, and these electrons are transferred via an external circuit. In the ideal charging of the cell, these electrons are generated at the positive electrode because there is extraction via oxidation of lithium ions from the active material of the positive electrode, and the electrons are consumed at the negative electrode because there is reduction of lithium ions into the active material of the negative electrode. During discharging, the exact opposite reactions occur.

Batteries with a lithium metal negative electrode afford exceptionally high specific energy (in Wh/kg) and energy density (in Wh/L) compared to batteries with conventional carbonaceous negative electrodes. However, the cycle life of such systems is rather limited due to (a) significant volume changes in the cell sandwich during every cycle as the Li metal is stripped and plated, (b) formation of dendrites during recharge that may penetrate the separator and short the cell and/or result in fragmentation and capacity loss of the negative electrode; (c) morphology changes in the metal upon extended cycling that result in a large overall volume change in the cell; and (d) changes in the structure and composition of the passivating layer that forms at the surface of the metal when exposed to certain electrolytes, which may isolate some metal and/or increase the resistance of the cell over time.

When high-specific-capacity negative electrodes such as a metal are used in a battery, the maximum benefit of the capacity increase over conventional systems is realized when a high-capacity positive electrode active material is also used. For example, conventional lithium-intercalating oxides (e.g., $LiCoO_2$, $LiNi_{0.8}Co_{0.15}Al_{0.05}O_2$, $Li_{1.1}Ni_{0.3}Co_{0.3}Mn_{0.3}O_2$) are typically limited to a theoretical capacity of 280 mAh/g (based on the mass of the lithiated oxide) and a practical capacity of 180 to 250 mAh/g, which is quite low compared to the specific capacity of lithium metal, 3863 mAh/g. The highest theoretical capacity for which some practical cycling has been achieved for a lithium-ion positive electrode is 1168 mAh/g (based on the mass of the lithiated material), which is shared by $Li_2S$ and $Li_2O_2$. Other high-capacity materials include $BiF_3$ (303 mAh/g, lithiated), $FeF_3$ (712 mAh/g, lithiated), $LiOH \cdot H_2O$ (639 mAh/g), and others. Unfortunately, all of these materials react with lithium at a lower voltage compared to conventional oxide positive electrodes, hence limiting the theoretical specific energy; however, the theoretical specific energies are still very high (>800 Wh/kg, compared to a maximum of ~500 Wh/kg for a cell with lithium negative and conventional oxide positive electrodes).

Figure 1:
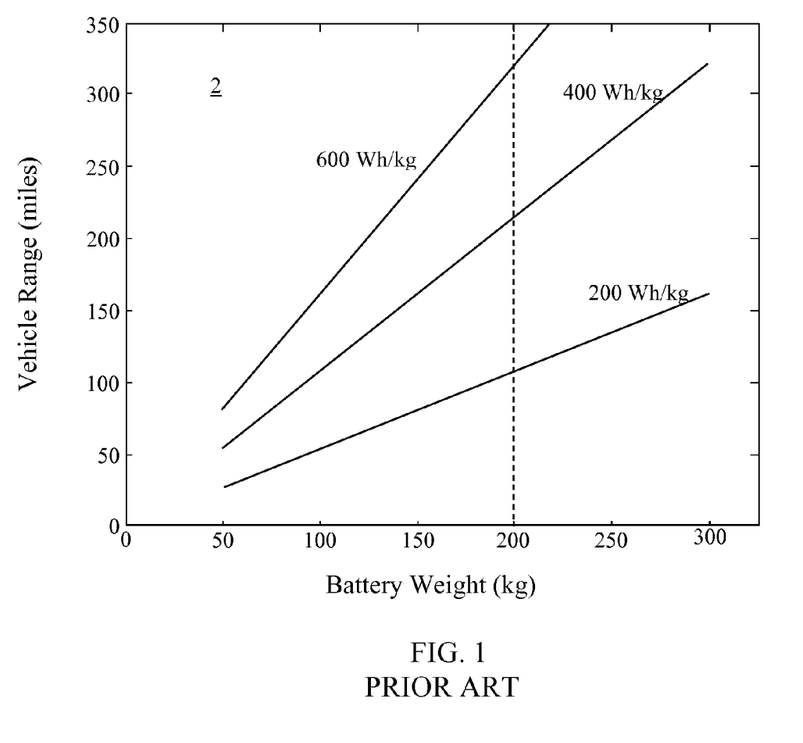
FIG. 1 depicts a plot showing the relationship between battery weight and vehicular range for various specific energies.

FIG. 1 depicts a chart 2 showing the range achievable for a vehicle using battery packs of different specific energies versus the weight of the battery pack. In the chart 10, the specific energies are for an entire cell, including cell packaging weight, assuming a 50% weight increase for forming a battery pack from a particular set of cells. The U.S. Department of Energy has established a weight limit of 200 kg for a battery pack that is located within a vehicle. Accordingly, only a battery pack with about 600 Wh/kg or more can achieve a range of 300 miles.

Figure 2:
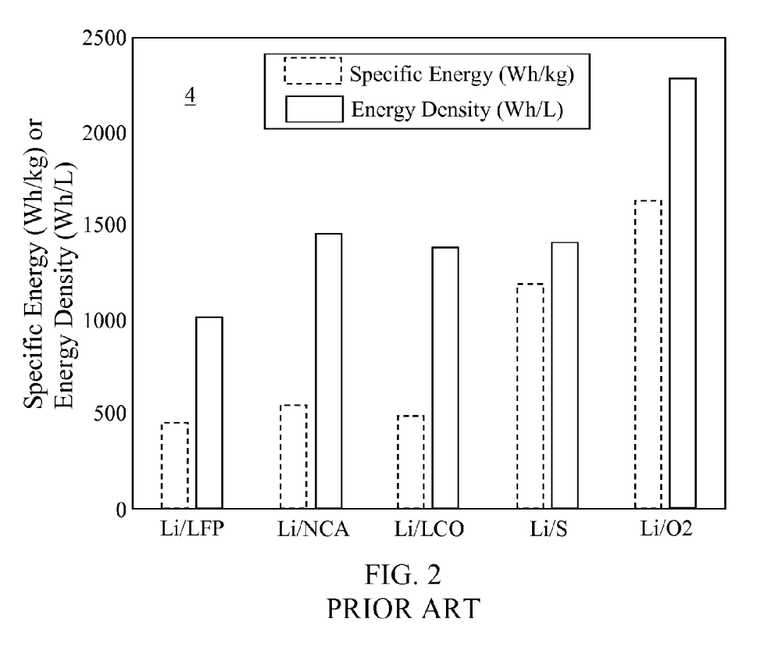
FIG. 2 depicts a chart of the specific energy and energy density of various lithium-based cells.

Various lithium-based chemistries have been investigated for use in various applications including in vehicles. FIG. 2 depicts a chart 4 which identifies the specific energy and energy density of various lithium-based chemistries. In the chart 4, only the weight of the active materials, current collectors, binders, separator, and other inert material of the battery cells are included. The packaging weight, such as tabs, the cell can, etc., are not included. As is evident from the chart 4, lithium/air batteries, even allowing for packaging weight, are capable of providing a specific energy>600 Wh/kg and thus have the potential to enable driving ranges of electric vehicles of more than 300 miles without recharging, at a similar cost to typical lithium ion batteries.

The appeal of a lithium/air cell is further exhibited by Table 1 below which shows properties of various discharge products of Li, O2, and other species.

| Active Material | Specific Capacity (mAh/g) | Density (g/cm³) | Capacity density (mAh/cm³) | $U^\theta$ vs. Li metal (V) | Theoretical specific energy (vs. Li metal) (kWh/kg) | Theoretical energy density (vs. Li metal) (kWh/l) |
|---|---|---|---|---|---|---|
| $Li_2O$ | 1794 | 2.01 | 3606 | 2.91 | 5.22 | 10.49 |
| $Li_2O_2$ | 1168 | 2.31 | 2698 | 2.96 | 3.46 | 7.99 |
| $LiOH \cdot H_2O$ | 639 | 1.51 | 965 | 3.45 | 2.20 | 3.33 |
| LiOH | 1119 | 1.46 | 1634 | 3.45 | 3.86 | 5.60 |
| $LiMO_2$, M = Mn, Ni, Co | 275 | 4.25 | 1169 | 3.75 | 1.03 | 4.36 |

-continued

| Active Material | Specific Capacity (mAh/g) | Density (g/cm³) | Capacity density (mAh/cm³) | U⁰ vs. Li metal (V) | Theoretical specific energy (vs. Li metal) (kWh/kg) | Theoretical energy density (vs. Li metal) (kWh/l) |
|---|---|---|---|---|---|---|
| LiFePO$_4$ | 170 | 3.6 | 612 | 3.42 | 0.58 | 2.09 |
| Li metal | 3861 | 0.534 | 2062 | 0.0 | | |

While lithium/air cells have been demonstrated in controlled laboratory environments, a number of issues remain before full commercial introduction of a lithium/air cell is viable. Thus, while lithium-based batteries have a sufficiently high specific energy (Wh/kg) and energy density (Wh/L) that they are now being used in electric-powered vehicles, in order to power a full-electric vehicle with a range of several hundred miles, a battery with a higher specific energy than the present state of the art (an intercalation system with a graphite anode and transition-metal oxide cathode) is necessary. For example, the lithium-oxygen battery, which uses a lithium metal negative electrode and a positive electrode that reacts $O_2$ and $H_2O$ to form LiOH (which has a solubility limit in $H_2O$ of ~5.2 M at room temperature) and LiOH.H2O (which precipitates out of solution once the solubility limit has been exceeded), has a significantly higher specific energy than the present state of the art.

Reactions among Li and $O_2$ to give high-energy products may be carried out in a number of chemical media and with additional reactants, as shown in Table 2 below:

| Reactants/Reaction | Comments |
|---|---|
| Non-aqueous | |
| $2Li + \frac{1}{2}O_2 \leftrightarrow Li_2O$ | Not typically observed |
| $2Li + O_2 \leftrightarrow Li_2O_2$ | Observed, no breaking the O—O bond, $Li_2O_2$ is reactive with carbon and many solvents |
| Aqueous: alkaline | |
| $2Li + \frac{1}{2}O_2 + H_2O \leftrightarrow 2LiOH$ | LiOH saturates at ~5.2M, limits energy storage |
| $2Li + \frac{1}{2}O_2 + 3H_2O \leftrightarrow 2LiOH \cdot H_2O$ | Principal reactant is $H_2O$! 6 $H_2O/O_2$, 1.5 $H_2O$/Li |
| Aqueous: "neutral" | |
| $2Li + \frac{1}{2}O_2 + 3H_2O \leftrightarrow 2LiOH \cdot H_2O$ (in concentrated LiCl or LiNO$_3$) | $Cl_2$ evolution possible for LiCl, extra salt adds mass and may also precipitate |
| Aqueous: acidic | |
| $2Li + \frac{1}{2}O_2 + 2AcOH \leftrightarrow 2AcOLi + H_2O$ | Lower theoretical energy than $Li_2O_2$, LiOH•$H_2O$ |

As two specific examples, in a non-aqueous medium the products $Li_2O_2$ and $Li_2O$ may form, while in a basic aqueous medium LiOH (dissolved) and eventually LiOH.$H_2O$ (precipitated) may form. In all of the cases shown in Table 2, the Li metal is consumed during discharge, leading to a significant volume change. In particular, for Li metal about 4.85 microns of Li metal are reacted per mAh/cm² of capacity, and because the target capacity is 20 mAh/cm² and above, a thickness change of the Li metal of at least 100 microns is required, although 200 microns or more (including some Li metal in excess) is desirable.

The discharge products shown in Table 2 have different densities and specific capacities, and may increase the volume of the region in which they are grown during discharge, depending on the composition of that region (e.g., whether it includes a gas phase that can be displaced and the mechanical boundary conditions of that region (e.g., whether displacement is prevented by a mechanical blocking layer).

Significant volume changes during cycling induce mechanical stresses within the individual regions in which the volume change takes place, as well as the overall cell. Other challenges include reducing the hysteresis between the charge and discharge voltages (which limits the round-trip energy efficiency), improving the number of cycles over which the system can be cycled reversibly, limiting dendrite formation at the lithium metal surface, protecting the lithium metal (and possibly other materials) from moisture and other potentially harmful components of air, and designing a system that actually achieves a high specific energy and has an acceptable specific power.

What is needed is a cell wherein the amount of volume change in the cell sandwich is reduced.

SUMMARY

In one embodiment of the disclosure, an electrochemical cell system includes an anode including a form of lithium metal, an OH⁻ exchange membrane, a precipitate reservoir in fluid communication with the anode and the OH⁻ exchange membrane, an $O_2$ evolution electrode associated with the precipitate reservoir, and a fluid reservoir in fluid communication with the precipitate reservoir, wherein the fluid reservoir includes a form of water when the electrochemical cell is fully charged.

In some embodiments, the electrochemical cell system is provided with an amount of water and an amount of lithium metal in the anode such that the ratio of the amount of water to the amount of lithium metal when the cell is fully charged is about 0.68 mole $H_2O$/mole Li. In some embodiments, the anode, the OH⁻ exchange membrane, the precipitate reservoir, and the $O_2$ evolution electrode are part of a cell sandwich and the fluid reservoir is spaced apart from the cell sandwich. In some embodiments, the $O_2$ evolution electrode extends partially out of the precipitate reservoir. In some embodiments, the cell system includes an $O_2$ reducing electrode and an anion-exchange membrane located between the $O_2$ reducing electrode and the precipitate reservoir. In some embodiments, the electrochemical cell system includes a lithium metal protection layer located between the anode and the precipitate reservoir. In some embodiments, the electrochemical cell system includes a pump operably connected to the fluid reservoir and the precipitate reservoir, the pump configured to force water from the fluid reservoir to the precipitate reservoir. In some systems, a battery control system is included which is configured to control the rate at which the pump forces water from the fluid reservoir to the precipitate reservoir.

In one embodiment, a method of operating an electrochemical cell system includes connecting the electrochemical cell system to an external load, transporting a form of lithium from an anode of the electrochemical cell system to a precipitate reservoir, precipitating $LiOH.{_2}O$ within the precipitate reservoir, and moving $H_2O$ from a fluid reservoir to the precipitate reservoir as the $LiOH.H_2O$ is being precipitated. In some embodiments, the method further includes producing $O_2$ and $H_2O$ during charge using an oxygen evolution electrode to oxidize $OH^-$.

In some embodiments, a method of operating an electrochemical cell system includes providing the electrochemical cell system with an amount of water, and an amount of lithium metal in the anode, such that the ratio of the amount of water to the amount of lithium metal when the electrochemical cell system is fully charged is about 0.68 mole $H_2O$/mole Li. In some embodiments, a method of operating an electrochemical cell system includes forcing water from the fluid reservoir to the precipitate reservoir. In some embodiments, forcing water from the fluid reservoir to the precipitate reservoir includes controlling the rate at which a pump forces water from the fluid reservoir to the precipitate reservoir using a battery control system.

DETAILED DESCRIPTION

In accordance with the present disclosure, a system is characterized by a reaction in which Li metal, $O_2$ gas, and $H_2O$ liquid or gas (although at least some of the $H_2O$ in some embodiments is in the liquid form, possibly in the form of a mixture of one or more salts, including LiOH), form $LiOH.H_2O$. The reaction is carried out in an aqueous medium. Salts such as $LiNO_3$, LiCl, and others are present in various embodiments to reduce the pH of the aqueous medium to improve materials compatibility, and may also pass freely to and from a reservoir adjacent to the cell sandwich.

Figure 3:
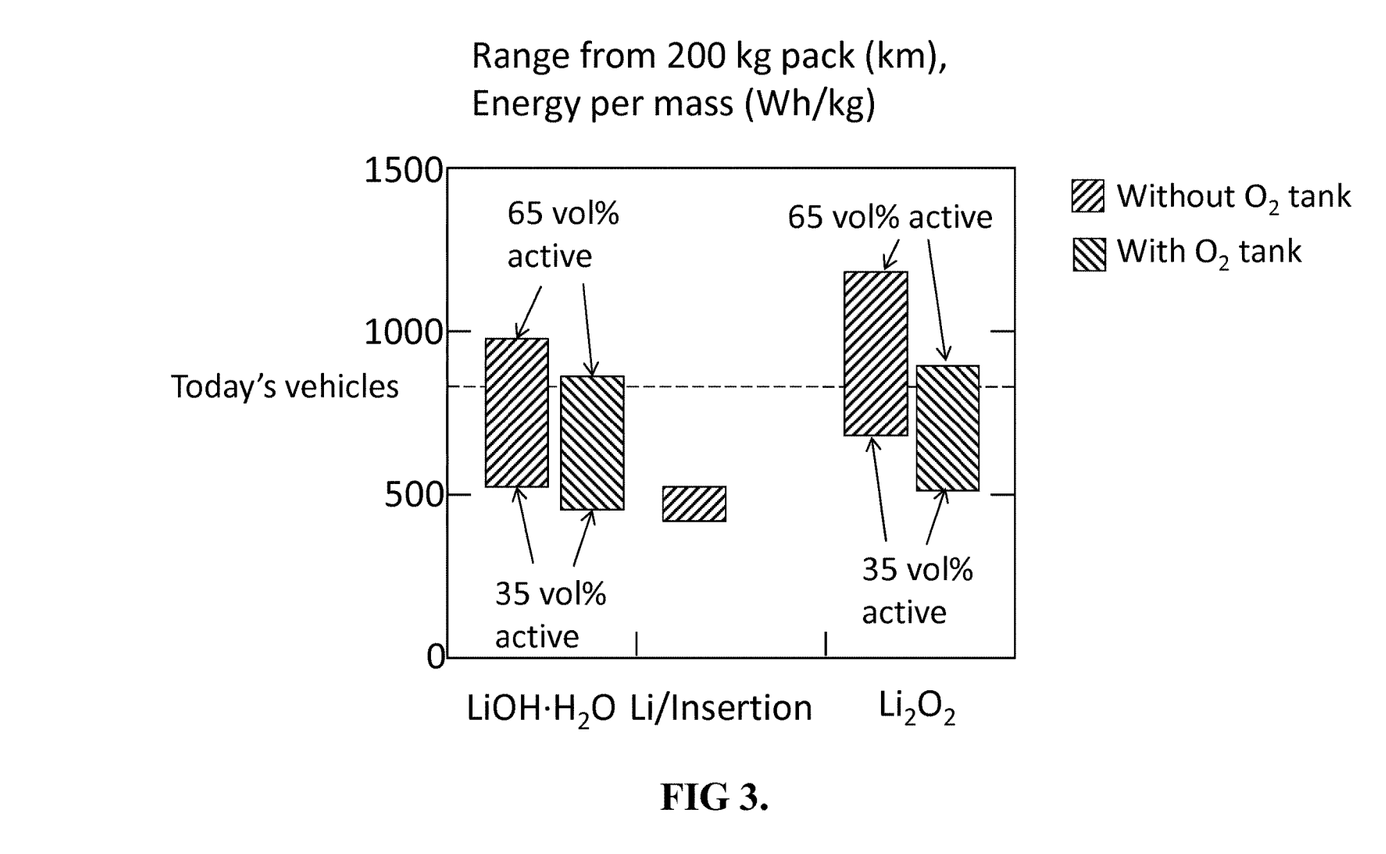
FIG. 3 depicts a chart showing that the energy per mass of a battery forming $LiOH.H_2O$ is higher when a larger volume fraction of $LiOH.H_2O$ is produced in the fully discharged cell.

The advantage of incorporating a battery which forms $LiOH.H_2O$ is shown in FIG. 3. In FIG. 3, the range and energy per mass of a $LiOH.H_2O$ Li insertion battery is compared to the range and energy per mass of a $Li_2O_2$ battery. The energy per mass of a battery forming $LiOH.H_2O$ is higher when a larger volume fraction of $LiOH.H_2O$ is produced in the fully discharged cell.

A cell sandwich in one embodiment (that is, a set of adjacent layers that may include a Li metal current collector (such as Cu), Li metal, Li metal protection layer(s), a reservoir region in which $LiOH.H_2O$ is precipitated during discharge and dissolves on charge, an electrode that oxidizes OH— to form $O_2$ and $H_2O$ and e-, an anion-exchange membrane that provides for the passage of anions (including OH—) but excludes the passage of cations (including Li+), an electrode that reduces $O_2$ by reacting it with $H_2O$ and e-, a micro-porous layer to manage $H_2O$ transport, a gas diffusion layer, and a flow field that also serves as a current collector) has a fixed thickness during cycling even while the thickness of the Li metal and the region in which the $LiOH.H_2O$ is deposited change significantly.

The $H_2O$ that is involved in the reaction is stored in a reservoir adjacent to the cell sandwich. The fluid that is transferred to and from the reservoir in some embodiments is pure $H_2O$, in some embodiments the fluid includes LiOH and/or other salts.

During discharge the $H_2O$ is supplied to the cell sandwich at a fixed rate. In particular, the total $H_2O$ consumed in the reaction is 1.5 mole $H_2O$/mole Li, and of that 1.5 mole $H_2O$/mole Li, about 0.82 moles $H_2O$/mole Li is stored in the cell sandwich and about 0.68 mole $H_2O$/mole Li is supplied from a reservoir adjacent to the cell sandwich. During charge the same number of moles of $H_2O$ that are supplied from within the cell sandwich and from the reservoir adjacent to the cell sandwich during discharge are returned to the cell sandwich and to the reservoir adjacent to the cell sandwich. These molar ratios specify the size of the reservoir that is required in order to maintain the cell sandwich with a fixed thickness during cycling.

Supplying and removing $H_2O$ (possibly with LiOH and other salts mixed with it) to and from the reservoir adjacent to the cell sandwich in different embodiments is accomplished by applying a force that comes from gravity, an overpressure, or a pumping device such as a piston pump, a centrifugal pump, or an injector. In some embodiments, vacuum is used to remove the $H_2O$ (possibly with LiOH and other salts mixed with it) from the cell sandwich during charge. The amount of $H_2O$ in some embodiments is controlled by a battery control system including a processor which executes program instructions to control the supply of $H_2O$ to the precipitate reservoir based upon a sensed current out of the cell.

Figure 4A:
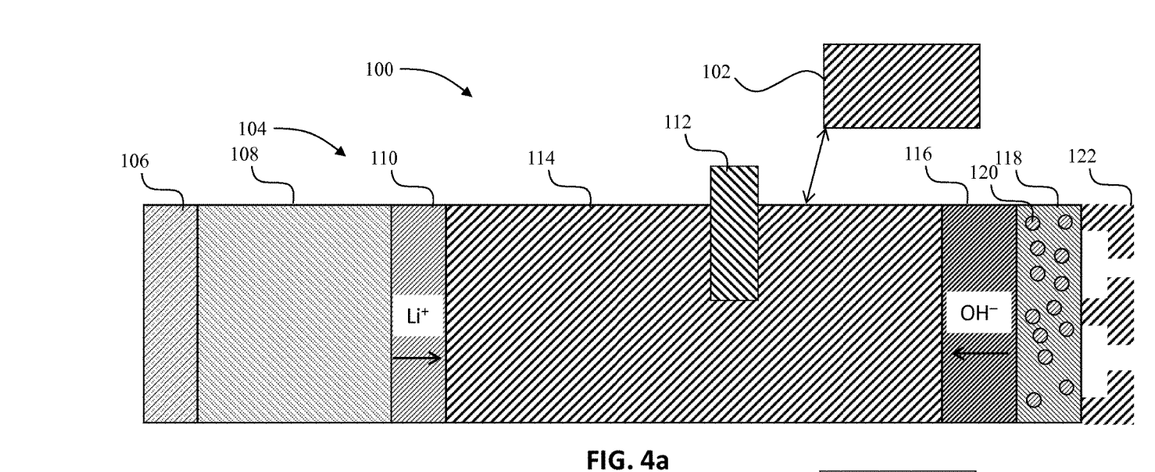
FIGS. 4a and 4b depict a Li/air electrochemical cell in a charged and discharged state, respectively, showing the use of a reservoir adjacent to the cell sandwich that provides $H_2O$ during discharge and accepts $H_2O$ during charge.

FIG. 4a shows one exemplary embodiment of a battery cell 100 in a charged condition. In FIG. 4a, a fluid reservoir 102 is located adjacent to the cell sandwich 104. The cell sandwich 104 includes a current collector 106, a lithium metal anode 108 and a lithium metal protection layer 110. An $O_2$ evolution electrode 112 extends outwardly from a precipitate reservoir 114 in which LiOH and $LiOH.H_2O$ are formed. The cell 100 further includes an $OH^-$ exchange membrane 116, an $O_2$ reducing electrode 118 (shown with gas phase 120), and a flow field/current collector 122.

The fluid reservoir 102 is filled with sufficient $H_2O$ that when the cell 100 is fully charged, a ratio of 0.68 mole H$_2$O/mole Li is realized where the H$_2$O includes the H$_2$O in the fluid reservoir 102 and the precipitate reservoir 102 and the Li includes the lithium metal in the anode 106. Depending upon the particular configuration, some H2O may also be present in, for example, piping or tubing or the fluid tank 102 when the cell is fully disharged, such that the actual ratio of all H2O to lithium metal in the cell is greater than 0.68 mole H$_2$O/mole Li. In some embodiments the fluid reservoir 102 includes LiOH, and other electrolyte components.

During discharge, the reservoir provides H$_2$O (and possibly electrolyte salts) to the precipitate reservoir region 114 within the cell sandwich 104 at the ratio of about 0.68 mole H$_2$O/mole Li that reacts. During charge H$_2$O is removed at the same rate. In practice, the appropriate amount of H$_2$O is supplied by forcing it into the cell sandwich during discharge using a pump (not shown) or other method that can provide a force, such as pressurizing the fluid reservoir 102. The application of a force has the added advantage of helping to maintain good contact between the various layers in the cell sandwich. Some of the H$_2$O that is supplied from the reservoir adjacent to the cell sandwich may pass through the anion-exchange membrane, where it may be consumed in the reaction at the oxygen reduction electrode (O$_2$+4e-+ 2H$_2$O→4OH—). As the discharge proceeds, the thickness of the Li metal layer is reduced, and the thickness of the reservoir region is increased, by exactly the same amount.

Figure 4B:
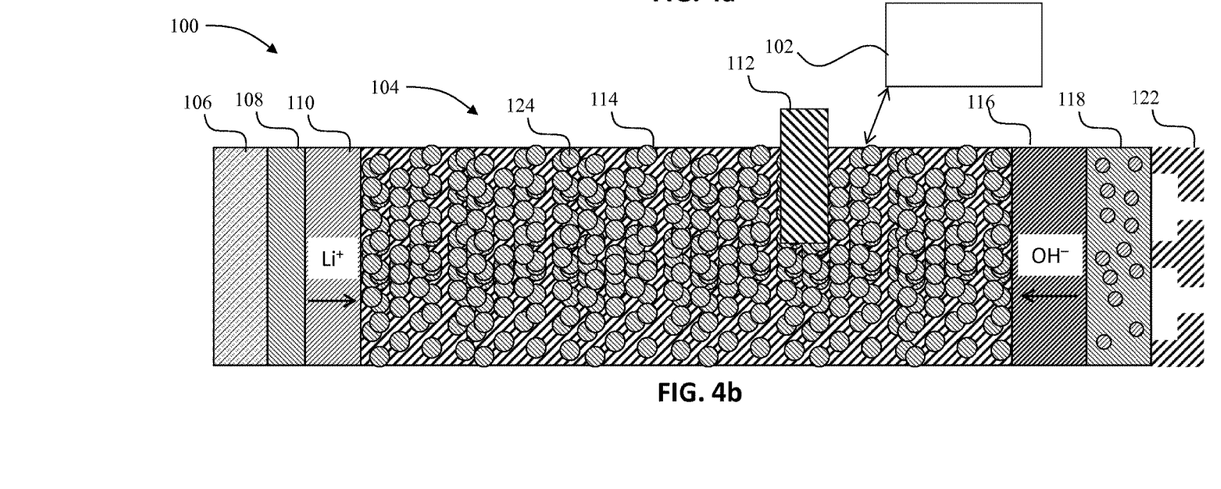

FIG. 4b shows the cell 100 after complete discharge. In FIG. 4b, the reservoir 102 is empty, having provided sufficient H$_2$O to maintain the thickness of the cell 100 even as the thickness of the lithium metal anode 108 has been greatly reduced. FIG. 4b further shows precipitates of LiOH, LiOH.H$_2$O formed in the precipitate reservoir 114.

Figure 5A:
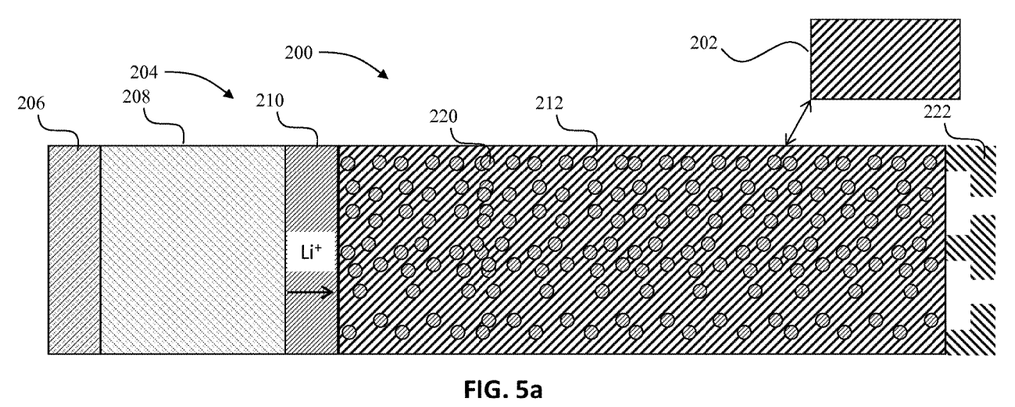
FIGS. 5a and 5b depict a Li/air electrochemical cell in a charged and discharged state, respectively, in which the $LiOH.H_2O$ product deposits directly in the electrode, also making use of a reservoir that supplies and accepts $H_2O$ (and other electrolyte components such as LiOH)

FIG. 5a shows another exemplary embodiment of a battery cell 200 in a charged condition. In FIG. 5a, a reservoir 202 is located adjacent to the cell sandwich 204. The cell sandwich 204 includes a current collector 206, a lithium metal anode 208 and a lithium metal protection layer 210. The cell 200 further includes a bi-functional O$_2$ electrode 212 (shown with gas phase 220) which also serves as a reservoir for LiOH, LiOH.H$_2$O, and a flow field/current collector 222.

Figure 5B:
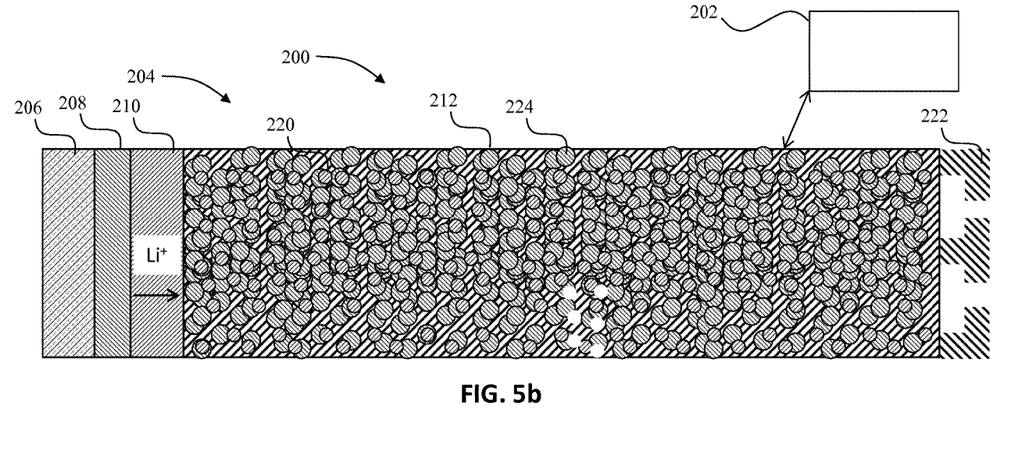

In the cell 200, the bi-functional oxygen evolution/reduction electrode 212 is employed, and there is no anion-exchange membrane. The O$_2$ evolution electrode is thus associated with the precipitate reservoir in that the bi-functional oxygen evolution/reduction electrode 212 performs the functions of both an O$_2$ evolution electrode and a precipitate reservoir. The LiOH.H$_2$O 224 is deposited directly in the electrode as shown in FIG. 5b. The electrode 212 is composed of a solid, liquid, and gas, as it is important to have the gas phase to allow for rapid transport of O$_2$ to and from the reaction sites during discharge and charge, respectively. The reservoir 202 adjacent to the cell sandwich 204 provides H$_2$O at a ratio of about 0.68 mole H$_2$O/mole Li during discharge, and receives H$_2$O at the same ratio during charge, and thereby ensures that there is no volume change in the cell sandwich in a manner similar to the cell 100.

Table 2 above shows that the Li$_2$O$_2$ and Li$_2$O discharge products have a capacity density higher than that of Li metal itself, implying that the volume of the discharge product is smaller than that of the Li metal reactant. The lower capacity density of LiOH.H$_2$O, and the possibility of using liquid H$_2$O as a reactant, allows tuning of volume changes within the cell sandwich in accordance with the present disclosure.

The present disclosure thus provides a longer cycle life because there are no volume changes in the cell sandwich, and hence less mechanical cycling on the cell packaging.

Additionally, the present disclosure provides a simpler design for the cell sandwich housing, and thereby a lower cost. Furthermore, the present disclosure provides a higher energy content per mass, because a high volume fraction of LiOH.H$_2$O is envisioned and enabled through the engineering of the H$_2$O supply and removal disclosed herein.

In prior art designs of aqueous Li/O$_2$—H$_2$O cells there is no detailed accounting for the source of H$_2$O that is used and its affect on the volume change that occurs within the cell sandwich. In the present disclosure there is a specific accounting for H$_2$O and a provision for its storage in order to keep the thickness of the cell sandwich constant and avoid changes in the level of electrolyte in the region in which the LiOH.H$_2$O is deposited.

Figure 6:
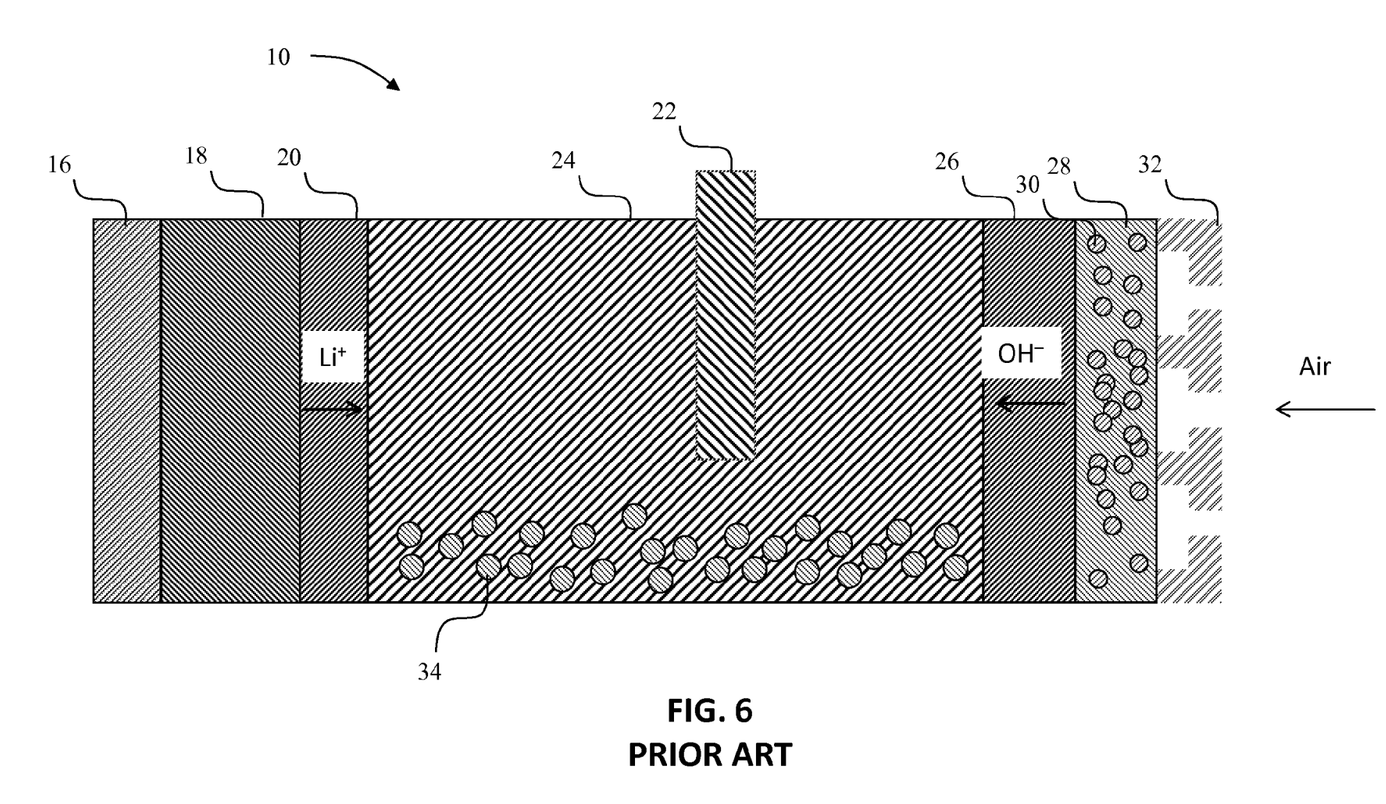
FIG. 6 depicts a prior art cell in the fully discharged state wherein only a small amount of $LiOH.H_2O$ is formed at the end of discharge, and there is no reservoir adjacent to the cell sandwich.

In contrast to the present disclosure, FIG. 6 depicts a prior art aqueous Li/O$_2$—H$_2$O cell 10 in a fully discharged state. The cell 10 is based on a design described by researchers at the Electricite de France and includes a current collector 16, a lithium metal anode 18 and a lithium metal protection layer 20. An O$_2$ evolution electrode 22 extends outwardly from a reservoir 24 for LiOH and LiOH.H$_2$O. The cell 10 further includes an OH$^-$ exchange membrane 26, an O$_2$ reducing electrode 28 (shown with gas phase 30), and a flow field/current collector 32.

In the cell 10, Li metal is used as the negative electrode 18, and is covered by one or more layers 20, ideally about 25 μm in width or less, that protect the Li metal from the aqueous electrolyte, and prevent the Li metal from forming dendrites or undergoing significant morphology changes. LiOH and LiOH.H$_2$O 34 produced during discharge are stored in the reservoir 24 which ideally is about 250 μm or more. During discharge, once the solubility limit of LiOH is reached (~5.2 M at 25° C.), LiOH.H$_2$O 34 precipitates out of the solution. The oxygen evolution electrode 22 is used during charge to oxidize OH—and produce O$_2$ and H$_2$O. The anion-exchange membrane 26, ideally about 25 μm in width or less, hinders the transport of Li+ and thereby prevents the deposition of any LiOH.H$_2$O in the positive electrode, while allowing OH— to freely pass into the reservoir region 24 (during discharge) or from it (during charge). Finally, the oxygen reduction electrode 28 is used during discharge to combine O$_2$, H$_2$O, and e- to form OH—. This electrode is composed of a mixture of catalyst, electronically conducting phase (e.g., carbon), ionically conducting phase (e.g., the anion-exchange membrane), and a gas phase (e.g., air or pure O$_2$), as three-phase boundaries are important for increasing the reaction rate.

As FIG. 6 shows, there is a small amount of LiOH.H$_2$O in the cell 10 in the fully discharged state. In such a case, there is no need to be concerned about volume changes because only a small amount of Li metal has been depleted, and only a small amount of LiOH.H$_2$O has been formed. While the prior art cell shown in FIG. 6 has the advantage of little volume change in the cell sandwich, it also doesn't store very much energy per mass, and therefore is not of great interest for automotive applications.

Figure 7A:
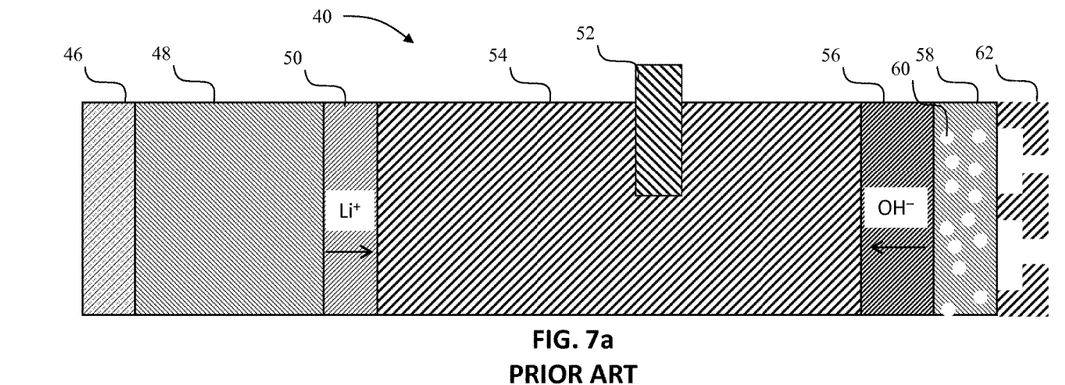
FIGS. 7a and 7b depict a prior art Li/air electrochemical cell in a charged and discharged state, respectively, in which a large volume fraction of $LiOH.H_2O$ is produced, but there is not careful control of the $H_2O$, and therefore there is a significant volume change.

FIG. 7a shows a prior art cell aqueous Li/O$_2$—H$_2$O cell 40 in a fully charged state. The cell 40 includes a current collector 46, a lithium metal anode 48 and a lithium metal protection layer 50. An O$_2$ evolution electrode 52 extends outwardly from a reservoir 54 for LiOH, LiOH.H$_2$O. The cell 40 further includes an OH$^-$ exchange membrane 56, an O$_2$ reducing electrode 58 (shown with gas phase 60), and a flow field/current collector 62.

Figure 7B:
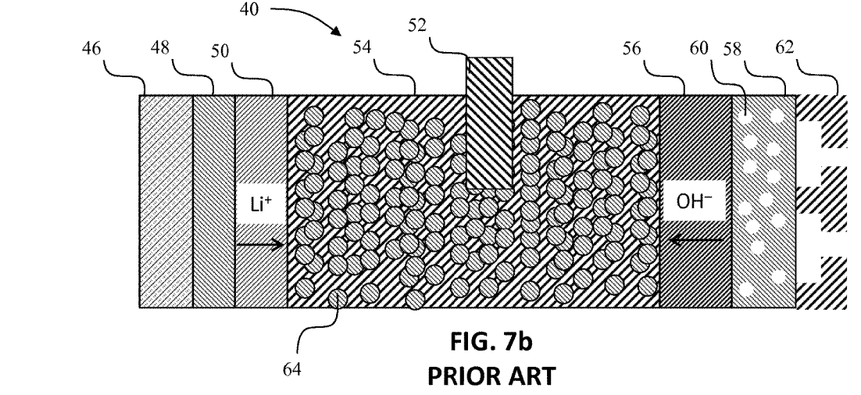

In the cell 40, a large volume fraction of LiOH.H$_2$O 64 is produced during discharge (see FIG. 7b), but only the H$_2$O initially present in the reservoir region in the cell sandwich is available for reaction. In this case the thickness of the cell sandwich falls significantly during discharge as seen by comparing the relative sizes of the cell 40 in FIGS. 7a and 7b, and the volume changes in the cell sandwich during cycle would likely lead to a short cycle life.

Figure 8A:
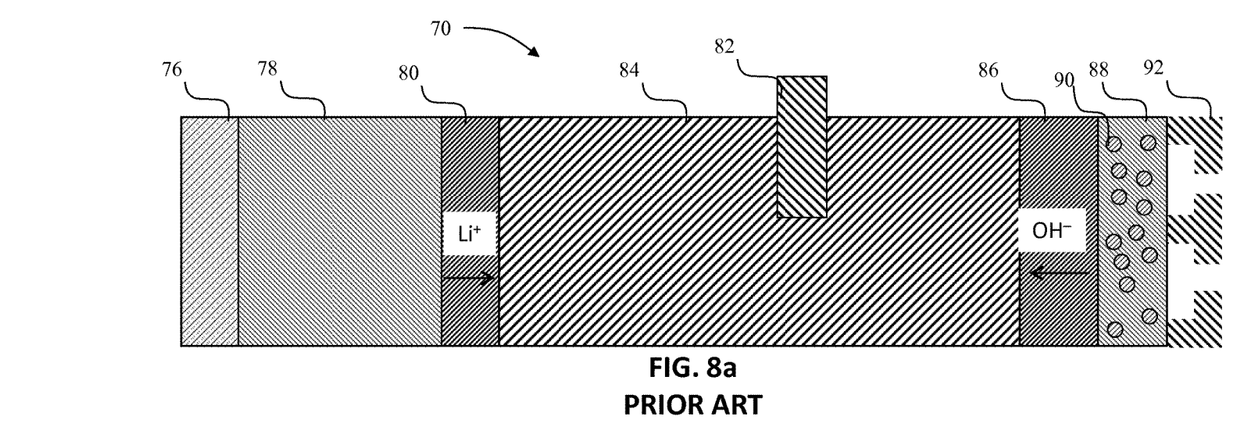
FIGS. 8a and 8b depict a prior art Li/air electrochemical cell in a charged and discharged state, respectively, in which a large volume fraction of $LiOH.H_2O$ is produced, but there is not careful control of the $H_2O$, and therefore there is a significant reduction in the amount of electrolyte in the reservoir.

FIG. 8a shows a prior art cell aqueous $Li/O_2$—$H_2O$ cell 70 in a fully charged state. The cell 70 includes a current collector 76, a lithium metal anode 78 and a lithium metal protection layer 80. An $O_2$ evolution electrode 82 extends outwardly from a reservoir 84 for LiOH, $LiOH.H_2O$. The cell 70 further includes an $OH^-$ exchange membrane 86, an $O_2$ reducing electrode 88 (shown with gas phase 90), and a flow field/current collector 92.

Figure 8B:
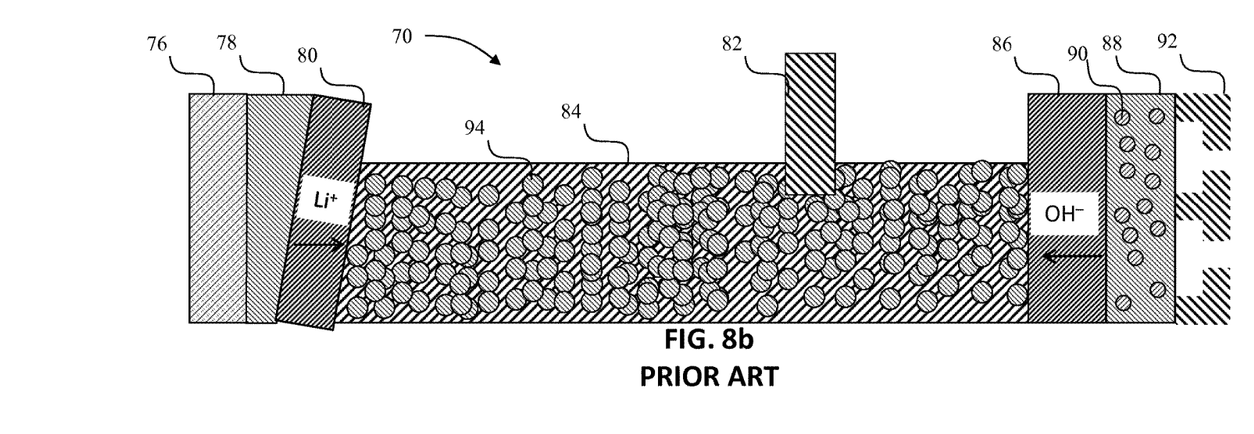

In the cell 70, the thickness of the cell sandwich is held constant as the cell 70 is discharged to the condition of FIG. 8b wherein $LiOH.H_2O$ 94 is produced. In this case the electrolyte level is depleted (see FIG. 8b), leading to a non-uniform current density on the Li metal and other components within the cell, and likely leading to a short cycle life and other problems. The Li metal current density is non-uniform because once the level of the electrolyte falls, no current is passed to the top of the Li metal, and therefore only the Li metal at the bottom of the Li metal region is able to react.

While the disclosure has been illustrated and described in detail in the drawings and foregoing description, the same should be considered as illustrative and not restrictive in character. Only the preferred embodiments have been presented and all changes, modifications and further applications that come within the spirit of the disclosure are desired to be protected.

What is claimed is:

1. An electrochemical cell, comprising: an anode within a cell sandwich including a form of lithium metal; an $OH^-$ exchange membrane within the cell sandwich; a precipitate reservoir within the cell sandwich in fluid communication with the anode and the $OH^-$ exchange membrane, wherein the cell sandwich is configured such that as the volume of the lithium metal is reduced during discharge of the cell, the volume of the precipitate reservoir increases; an $O_2$ evolution electrode extending out of the precipitate reservoir; and a fluid reservoir in fluid communication with the precipitate reservoir; wherein the fluid reservoir includes a form of water when the electrochemical cell is fully charged, wherein the cell is provided with an amount of water, and an amount of lithium metal in the anode such that the ratio of the amount of water to the amount of lithium metal when the cell is fully charged is about 0.68 mole $H_2O$/mole Li.

2. The electrochemical cell of claim 1, wherein:
   the fluid reservoir is spaced apart from the cell sandwich.

3. The electrochemical cell of claim 2, wherein the $O_2$ evolution electrode extends partially out of the precipitate reservoir.

4. The electrochemical cell of claim 3, further comprising:
   an $O_2$ reducing electrode, wherein
   the $OH^-$ exchange membrane is located between the $O_2$ reducing electrode and the precipitate reservoir.

5. The electrochemical cell of claim 4, further comprising:
   a lithium metal protection layer located between the anode and the precipitate reservoir.

6. The electrochemical cell of claim 5, further comprising:
   a pump operably connected to the fluid reservoir and the precipitate reservoir, the pump configured to force water from the fluid reservoir to the precipitate reservoir.

7. The electrochemical cell of claim 6, further comprising:
   a battery control system configured to control the rate at which the pump forces water from the fluid reservoir to the precipitate reservoir.

* * * * *

UNITED STATES PATENT AND TRADEMARK OFFICE
CERTIFICATE OF CORRECTION

PATENT NO. : 10,270,093 B2
APPLICATION NO. : 14/758321
DATED : April 23, 2019
INVENTOR(S) : Albertus et al.

Page 1 of 1

It is certified that error appears in the above-identified patent and that said Letters Patent is hereby corrected as shown below:

On the Title Page

1: Item (57) should read:
ABSTRACT
An electrochemical cell includes an anode including a form of lithium metal, an OH⁻ exchange membrane, a precipitate reservoir in fluid communication with the anode and the OH⁻ exchange membrane, an $O_2$ evolution electrode associated with the precipitate reservoir, and a fluid reservoir in fluid communication with the precipitate reservoir, wherein the fluid reservoir includes a form of water when the electrochemical cell is fully charged.

In the Claims

2: In Column 10, Lines 7-9, Lines 10-12 of Claim 1 should read:
a fluid reservoir in fluid communication with the precipitate reservoir, wherein the fluid reservoir includes a form of water when the electrochemical cell is fully charged, Signed and Sealed this
Second Day of July, 2019

Andrei Iancu
*Director of the United States Patent and Trademark Office*